W. A. OSLEY.
HOSE BAND.
APPLICATION FILED AUG. 7, 1919.

1,372,629. Patented Mar. 22, 1921.

WITNESS:
C. C. West

INVENTOR.
Willard A. Osley
BY
Frank A. Cutter,
ATTORNEY.

UNITED STATES PATENT OFFICE.

WILLARD A. OSLEY, OF SPRINGFIELD, MASSACHUSETTS.

HOSE-BAND.

1,372,629.　　　　　　Specification of Letters Patent.　　Patented Mar. 22, 1921.

Application filed August 7, 1919. Serial No. 315,849.

*To all whom it may concern:*

Be it known that I, WILLARD A. OSLEY, a citizen of the United States of America, and a resident of Springfield, in the county of Hampden and State of Massachusetts, have invented a new and useful Hose-Band, of which the following is a specification.

My invention relates to improvements in preventive and anti-friction devices designed to be attached to hose at intervals on the outside, and consists of a flexible, tubular member, preferably a coil spring, partially encircling the hose, and a flexible and pliable binding member, usually in the form of a piece of annealed wire, which is passed through said tubular member, twisted together at the place where it emerges from said tubular member, and then encircles said hose behind, in the direction of movement of the hose, said tubular member, the ends of said binding member being united, all as hereinafter set forth.

This invention is an improvement of the hose band which is covered by United States Letters Patent, No. 1,268,761, issued to me June 4, 1918.

Large and heavy hose which has to be dragged about on the floor with greater or less frequency, such as that employed with vacuum-cleaner systems in large buildings, is difficult to handle and soon wears out, owing to the friction between the hose and the floor, and the primary object of my invention is to provide a band for such hose, which supports the latter above the floor and so prevents wear, and at the same time reduces the frictional resistance whereby it is possible to move the hose about with very much less effort. It is to be understood that several of my bands are applied in spaced relationship, to each hose, the distance between such bands and the number of the same applied to a length of hose depending upon the conditions to be met and overcome and upon the lineal feet of such length of hose.

Another object is to provide bands of this character which are free from projections that would be liable to catch upon objects over which the hose equipped with such bands is dragged, and to scratch the surfaces over which such hose moves.

A further object is to provide such a band which is simple and inexpensive, can be readily applied, is strong and durable, and can not creep or become displaced on the hose.

Other objects and advantages will appear in the course of the following description.

I attain the objects and secure the advantages of my invention by the means illustrated in the accompanying drawings, in which—

Figure 1:
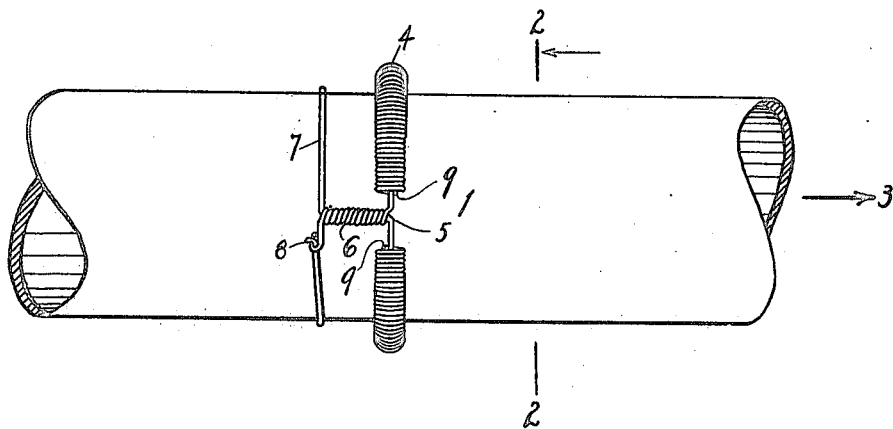
Figure 2:
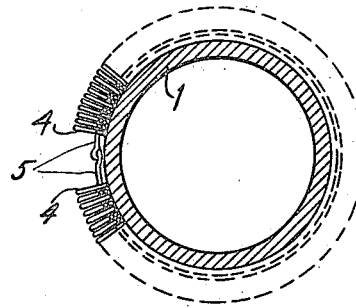

Figure 1 is an elevation of a short section of hose having a band applied thereto which embodies a practical form of my invention, and, Fig. 2, a cross-section through said hose, taken on lines 2—2, looking in the direction of the associated arrow, in Fig. 1.

Similar reference characters designate similar parts throughout the several views.

A short section of hose is represented at 1. This hose may be of any length and have attached thereto as many of my bands as may be deemed necessary, such bands being arranged at intervals which are reasonable distances apart. The bands encircle the hose 1 and support the same from the floor, so that said hose does not come into contact with such floor and is not worn by reason of such contact. Furthermore, the bands are comparatively small in cross-section and circular in both directions, and therefore present no great amount of contacting surfaces to the floor and consequently afford very little frictional resistance as the hose is dragged along or moved about on the floor. The arrow 3, in Fig. 1, designates the general direction in which the hose 1 is to be moved.

Each band consists of a spiral spring 4 which is of insufficient length entirely to encircle the hose 1, the ends of such spring falling short of each other a short distance, and a wire 5 which encircles said spring inside, passes out between said ends of said spring, is twisted together at 6, then passes entirely around the hose to form a tie or anchorage band 7, and has its ends twisted or otherwise united together at 8.

The spiral spring 4 is arranged on the hose 1 in such a manner that the cut ends 9—9, of the wire of which said spring is made, are next to said hose, so that they are not in a position to come into contact with any object or with the floor as the hose is moved about from place to place.

The wire 5 is annealed so that it is ductile. This wire upon being twisted together at 6, binds the spiral spring 4 tightly against the hose 1, and said wire is then bound directly around said hose at 7, behind said spring in the direction of movement of the hose, so that under ordinary circumstances and with customary usage said spring can not be displaced either rearwardly or circumferentially. This is a very important feature, inasmuch as it is necessary to maintain the bands in properly spaced relationship, otherwise the bands would be liable to become separated to such an extent as to permit portions of the hose to sag and come into contact with the floor.

The manner in which the band is applied to the hose 1 is described as follows:

The spring 4 is strung on the wire 5, which latter has been cut to the proper length, the parts are wrapped around the hose, the twist 6 is made in said wire, the latter is carried around said hose in both directions, and the ends of the wire are securely twisted together at 8. During the operation the wire 5 is twisted so tightly as to exert the required binding force on the spring 4, and also to cause the band 7 to grip the hose with the required amount of force. The wire 5 now holds the spring 4 tightly in contact with the hose 1. Preferably the parts are applied to the hose so that the twisted portion at 6 and the opening between the adjacent ends of the spring 4 are located on top of the hose, but such location of said twisted portion and opening need not necessarily be adhered to.

Although the embodiment herein illustrated and described of my invention is a practical and preferred form of the same, it is conceivable that changes in the shape, size, material, and even in minor points of construction, of some or all of the parts of the band may be made without exceeding the scope of what is claimed.

In this connection it may be remarked that the size of the band and its parts must be changed in order to accommodate the same to different sizes in diameter of hose.

It is a noteworthy fact that a pair of wire-cutting pliers is the only tool needed with which to fasten these bands to the hose.

What I claim as my invention, and desire to secure by Letters Patent, is—

1. A hose band comprising a tubular member adapted partially to encircle a hose, and an encircling binding member which passes around inside of said tubular member, emerges from the ends of said tubular member and is twisted together, is passed around said hose, and has its ends fastened together.

2. A hose band comprising a spiral spring adapted partially to encircle a hose, and a wire adapted to be passed through said spring, twisted together outside of the same, passed around said hose outside of said spring, and have its ends fastened together, the ends of said spring being out of contact with each other.

3. A hose band comprising a spiral spring adapted partially to encircle a hose, and a wire adapted to be passed through said spring, twisted together outside of the same, passed around said hose outside of said spring, and have its ends fastened together, said spring being arranged on said hose with the cut ends of the spring adjacent to the hose.

WILLARD A. OSLEY.

Witnesses:
F. A. CUTTER,
A. C. FAIRBANKS.